United States Patent Office 3,159,143
Patented Dec. 1, 1964

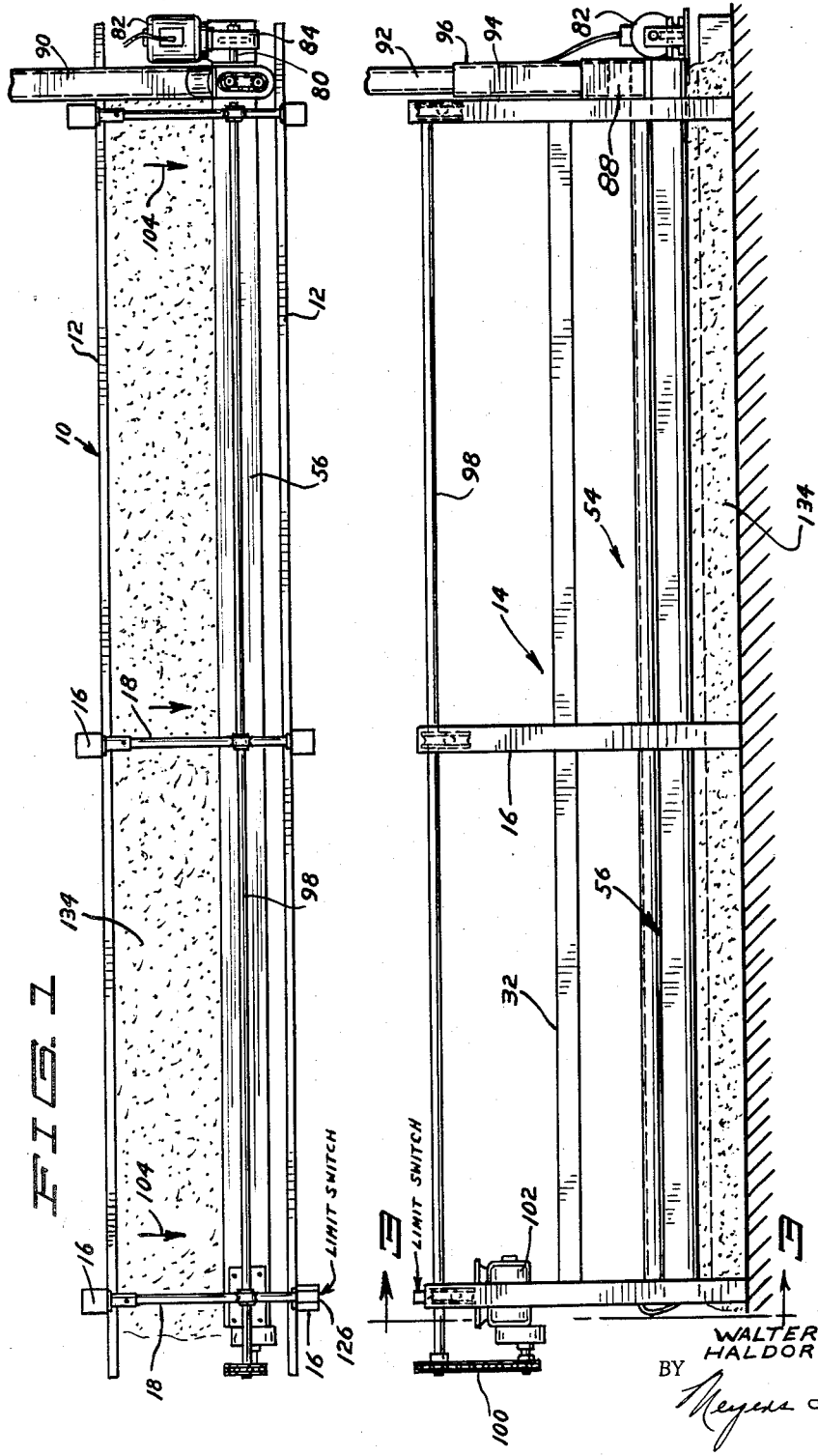

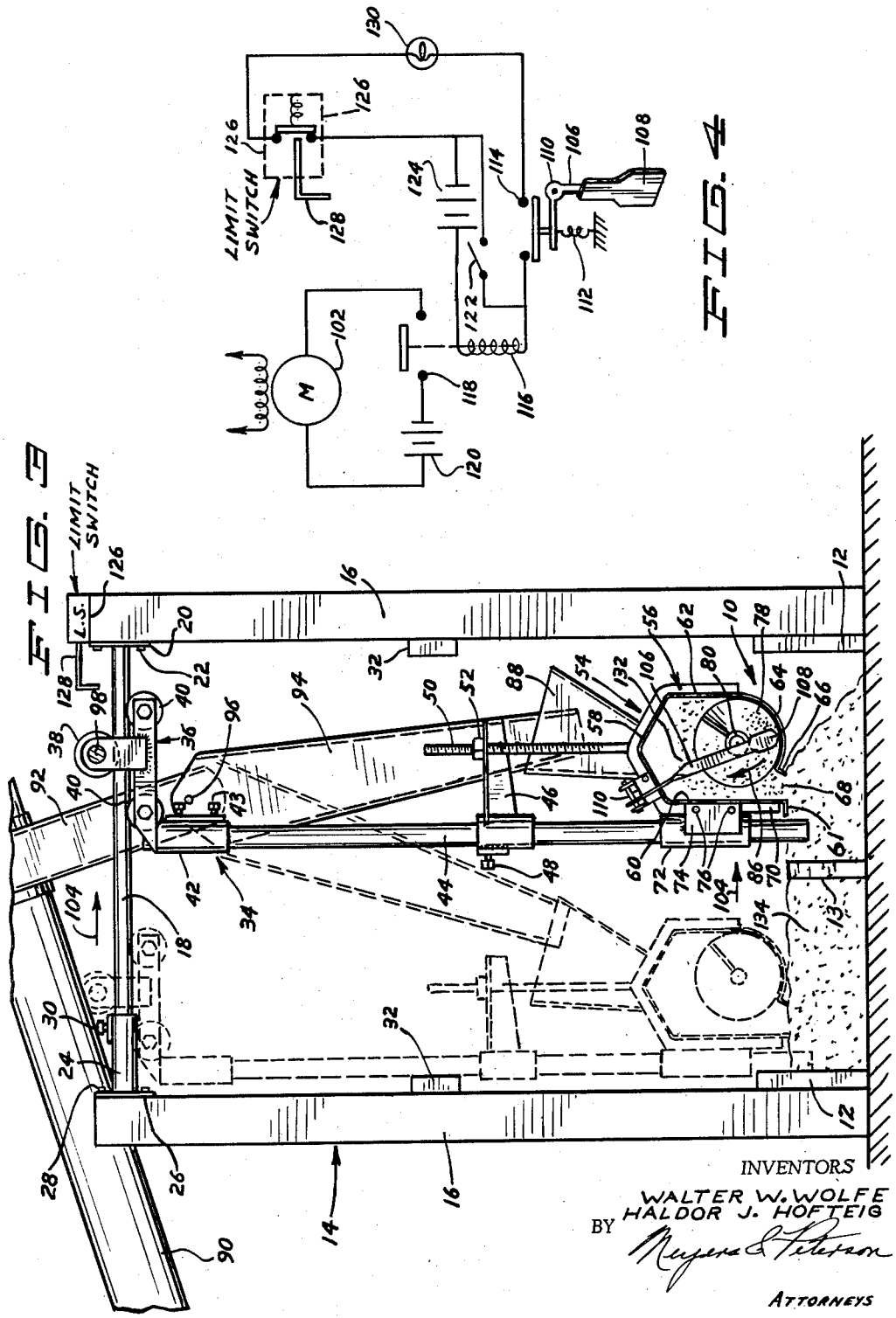

3,159,143
PROGRESSIVE ROW TROUGH FEEDER
Walter W. Wolfe and Haldor J. Hofteig, Mound, Minn., assignors to Van Dusen & Co., Inc., Wayzata, Minn., a corporation of Minnesota
Filed July 1, 1963, Ser. No. 291,974
5 Claims. (Cl. 119—52)

This invention relates generally to feed troughs for livestock, and pertains more particularly to apparatus for supplying predetermined quantities of feed thereto.

One object of the invention is to provide apparatus for supplying feed to a trough with a minimum of human effort and expense. More specifically, the invention has for an aim the replenishing of the feed in the trough when needed in an automatic or semi-automatic fashion, the degree of automation that can be incorporated into the feeding system depending largely upon the specific requirements of the particular farm or ranch. Stated somewhat differently, the invention envisages a feeding arrangement that is quite flexible or versatile and which can be easily designed to be sold at a price directly in line with the number of animals to be fed.

Another object of the invention, which object is correlated with the preceding object, is to provide apparatus for supplying feed to troughs that can be used for different width troughs without modification. Still further, it is within the contemplation of the invention to supply apparatus of the foregoing character that can be made so as to have any desired length.

Another object of the invention is to provide a method and apparatus for supplying feed to troughs that will, in effect, meter out predetermined quantities of feed in accordance with the number of animals to be fed at a given time. In this regard, the equipment might be designed to accommodate a relatively large number of animals, but at times only a few animals are to be provided with feed and the instant invention permits this to be achieved very readily.

A still further object of the invention is to provide apparatus capable of distributing one or more feeds uniformly over the entire trough so that each animal can obtain its fair share.

A still further object of the invention is to provide an automated trough that can be erected very easily or taken down equally easy, thereby permitting movement from one location to another as circumstances dictate.

Yet another object of the invention is to provide equipment of the general character alluded to that will be simple to operate, this being particularly true with respect to the electric circuit that is involved. Also, it is an aim of the invention to provide apparatus that is exceedingly rugged, that may be easily cleaned, and that will require little or no maintenance.

A further object of the invention is to provide an automatic or semi-automatic feeding trough that will permit the distribution of various types of feed and which will be non-clogging for all such feeds. In this connection it is further contemplated that a central baffle may be employed so that the apparatus can be used for supplying different quantities of feed at the respective sides, or one type of feed to one side of the baffle and a different type of feed to the other side.

Quite briefly, the invention includes a screw-type conveyor having a bottom slot so that the feed is augered in such a way that the feed is gravitationally discharged through the slot until a row of feed has been deposited. Provision is made for determining when a sufficient amount of feed has been deposited in a given row, further provision being made for shifting or advancing the conveyor laterally so that a succeeding row of feed is deposited next to the preceding row. Reliance is made upon the lateral movement of the conveyor from row to row for spreading the feed and thereby producing a predetermined height of feed within the trough, the height depending upon the adjusted elevation of the conveyor.

These and other objects and advantages of our invention will more fully appear from the following description, made in connection with the accompanying drawings, wherein like reference characters refer to the same or similar parts throughout the several views and in which:

FIGURE 1 is a top plan view of a feed trough automated in accordance with the present invention;

FIGURE 2 is a side elevational view corresponding to FIGURE 1;

FIGURE 3 is an end elevational view taken from the left as viewed in FIGURES 1 and 2 but considerably enlarged thereover; and FIGURE 4 is a schematic diagram of one form the electrical circuitry can assume.

Referring now in detail to the drawings, the trough has been designated generally by the reference numeral 10 and includes spaced upstanding side walls 12 and an intermediate baffle 13. A frame denoted in its entirety by the reference numeral 14 surmounts the trough 10. The frame 14 comprises any desired number of vertical posts 16, the number depending mainly on the length of the trough 10. Supported at the upper ends of the posts 16 are transverse tracks or rails 18. From FIGURE 3, it can be seen that each track 18 has a flange 20 at one end and by reason of a plurality of bolts 22 this particular end of the track can be secured to the vertical posts 16 at one side of the trough 10. The other end of each track 18 is received in a socket 24 having a flange 26 thereon which is secured by means of bolts 28 to the upper end of the post 16 at the opposite side of the trough 10. Through the agency of a set screw 30, the particular track 18 can be anchored with respect to its cooperable socket 24. In this way, the posts 16 at each side of the trough 10 do not have to be spaced accurately, the telescopic arrangement provided by the sockets 24 permitting the several tracks 18 to bridge the span between the posts 16 at each side of the trough 10. Additional bracing 32 for frames 14 may be supplied.

Each track 18 supports a carriage structure indicated generally by the reference numeral 34. At the upper end of each carriage structure 34 is a trolley 36 having an upper grooved wheel 38 and a pair of lower grooved wheels 40. Integral with each trolley 36 and constituting a portion of the carriage 34 in each instance is a downwardly directed socket 42 which by means of a pair of set screws retains the upper end of a column 44.

Continuing with the general description of an individual carriage structure 34, it is to be discerned that there is an adjustable bracket 46 that extends laterally from each column 44, there being a set screw 48 that retains the bracket at a desired elevation. Depending from the bracket 46 in each instance is a threaded rod 50 having a nut 52 thereon in order to determine the vertical location of the rod 50, the nut 52 bearing against the bracket 46 and the rod 50 extending through an aperture formed in the bracket.

The various threaded rods support a conveyor that has been generally indicated by the reference numeral 54. The conveyor 54 includes a casing 56 that will now be described in detail. The casing 56 includes a sloping top 58 of angulated configuration when viewed from one end. As can be seen from FIGURE 3, the casing 56 further includes one vertical side 60 that is relatively long, which has a horizontal lower lip 61 extending longitudinally along its lower edge, and a second vertical side 62 that is relatively short. Integral with the lower edge of the shorter side 62 is an arcuate bottom 64 that extends toward the lower edge of the wall 60 and which terminates in a longitudinal lip 66 that provides a slot 68 owing to the spaced relationship of said lip 66 from the lower lip 61 on the side 60.

While the conveyor 54 is suspended at spaced longitudinal locations from the several brackets 46, a flange 70 extending about the major portion of the casing 56 assists in steadying the conveyor as it is shifted. The flange 70 in each instance is attached to a bracket comprised of a sleeve 72 that encircles the column 44. The connection is effected through the medium of a plate 74 secured to the sleeve 72, as by welding, and a pair of bolts 76 which extend through the flange 70.

At this time, attention is called to an auger screw 78 that is an important part of the conveyor that has been previously referred to in a general way and indicated by the reference numeral 54. The screw 78 is of conventional construction, having a continuous helical flight fixedly mounted on a shaft 80. As best viewed in FIGURE 1, the shaft 80 is coupled to an electric motor 82 via gears contained in a gear box 84. An arrow 86 shown in FIGURE 3 indicates the direction that the screw 78 rotates when driven by the motor 82.

Located at the same end of the frame 14 as is situated the motor 82 is a tapered inlet 88 on the conveyor casing 56. In order to deliver the feed to the inlet 88, there is an inclined elevating conveyor 90 having its lower end such as to receive the feed that is to be placed in the trough 10. The elevating conveyor 90 can be of the screw type, just as is the conveyor 54, and the conveyor 90 moves the feed upwardly to a downspout 92. The downspout 92 has a pivoted chute section 94 swingingly suspended therefrom through the agency of the pivot pin 96. The lower end of the chute section 94 extends into the upper end of the tapered inlet 88. In this way, the feed that is conveyed upwardly via the conveyor 90 is discharged into the inlet 88 for further horizontal conveying by means of the conveyor 54. The action that takes place will be better understood when a typical operational sequency is hereinafter presented.

In order to shift or advance the conveyor 54 in a lateral direction from the phantom outline position shown in FIGURE 3 to the solid position also appearing in the same figure, an upper shaft 98 is employed, the wheels 38 being keyed to said shaft. The shaft 98, as should be evident, extends the full length of the trough 10. The shaft 98 is driven through a flexible chain 100 that is driven by an electric motor 102. The arrows 104 indicate the direction in which the conveyor moves; as already explained, the conveyor 54 moves from the phantom outline position to the solid outline position in FIGURE 3 and two such arrows have been applied to this figure in addition to the several arrows shown in FIGURE 1.

Inasmuch as the motor 102 is instrumental in advancing or shifting the conveyor 54, the way in which the motor 102 is energized will now be described. First, attention is called to the presence of a rocker arm 106 provided with a blade portion 108 at the bottom thereof. The rocker arm 106 is pivotally mounted to one end of the casing 56 by means of a pin 110. This structure is also pictured in FIGURE 4. The rocker arm 106 is biased by a coil spring 112 (FIGURE 4) in a direction such as to urge the blade portion 108 toward the end of the screw 78 as can be discerned from FIGURE 3 and which is in a clockwise direction as set forth in FIGURE 4.

The rocker arm 106 by reason of the spring 112 actuates a switch 114 into a normally open position. As can readily be seen from FIGURE 4, the switch 114 is in circuit with the operating coil of a relay 116 having normally open switch contacts 118 that are closed only when the relay 116 is energized. The normally open switch contacts 118 are in a serial relation with the motor 102 and a source of power 120 which has been indicated as simply being a battery. Thus, while the motor 102 is depicted as being a D.-C. motor, in practice it will usually be an A.-C. motor.

The operating coil of the relay 116 in addition to being in circuit with the normally open contacts 114 is in circuit with a manual switch 122 and a source of power 124 (here again denoted as a battery). Still further, it is planned that a limit switch 126, which switch appears also in FIGURES 1-3, be employed, the limit switch being normally closed but actuatable into an open position through an L-shaped plunger 128 that is engaged by the trolley wheel 38 when the respective carriages 34 and the conveyor 54 mounted thereon have made a complete traverse of the trough 10. At some remote vantage point there is situated an indicating lamp 130 so as to advise the operator that the conveyor 54 has made a full traverse of the trough 10; hence, the lamp 130 is also in series with the switch 114, as well as the relay 116, the manual switch 122, the battery 124 and the limit switch 126.

Having in mind the construction and arrangement of the principal elements thereof, it is believed that a complete understanding of my apparatus may be now had from a description of the operation of said apparatus. Assuming that the conveyor 90 is elevating the feed from a source of supply, the feed exits from the conveyor 90, falling gravitationally into the chute section 94 which is at the outset in the angular position shown in phantom outline in FIGURE 3. It will also be observed that the various carriages 34 are as far left as they can be when starting to distribute the feed into the trough 10. For the sake of discussion, it will be further assumed that the brackets 46 have been adjusted to substantially the correct height at which the conveyor 54 is to be operated. The sleeves 72 freely encircle the columns 44 in each instance so that the brackets 46 can be positioned at the desired elevation and then the set screw 48 associated with each particular bracket 46 can be tightened so as to clamp the several brackets in place. Further adjustment of the elevation of the conveyor 54 is possible by reason of the adjustment provided by the nuts 52 on the vertical rods 50.

With the conveyor 54 in the phantom outline position shown in FIGURE 3, there is no reason for having the motor 102 operate initially, but the motor 82 which rotates the screw 78 should be started so as to cause the screw to advance the feed, which has been labeled 132, longitudinally through the casing 56. It will be recalled that the slot 68 extends the full length of the casing 56, so the feed 132 is continually discharged through the slot 68 as it is advanced through the casing 56 by the screw 54. Stated somewhat differently, as the feed 132 is discharged through the slot 68 and deposited within the trough 10, the deposited feed being labelled 134, the action taking place will gradually build up one row of deposited feed 134. Because in the drawing the conveyor 54 has already been moved from the phantom outline position of FIGURE 3 which is adjacent the left side 12 to the solid line position which is adjacent the right side 12, the first row does not appear as a row. Actually, attention is directed at this time to the presence of the lip 61 which is in effect dragged across the top of the various rows constituting the deposited feed 134 so as to distribute the feed uniformly between the sides 12 of the trough 10.

In the formation of the first row, it will be understood that the row is gradually deposited from the right to the left as viewed in FIGURES 1 and 2 ( toward the viewer in FIGURE 3). At the beginning of the conveying action provided by the screw 78, the feed 132 will be discharged through the slot 68 in the immediate vicinity of the right end of the trough 10 as viewed in FIGURES 1 and 2. However, the building up of the first row in the vicinity of the right end as viewed in FIGURES 1 and 2 will cause the feed to be progressively advanced longitudinally through the casing 56, the continued lengthening of the first row causing the feed to be advanced farther and farther through the casing.

When the first row has been built up so that it is coextensive with the length of the casing 56, then it will be appreciated that the feed 132 is urged against the blade portion 108 of the rocker arm 106. This produces a pressural action that rocks the arm 106 about its pivot pin 110 so as to close the normally open switch 114. It can be seen that a circuit is completed through the operating coil of the relay 116 with the consequence that its normally open switch contacts 118 are closed and the motor 102 thereby energized. Operation of the motor 102, of course, causes the shaft 98 to be rotated, and the various trolleys 36 and the carriages 34 with which they are associated are moved toward the right as viewed in FIGURE 3, this being in the direction of the arrows 104 shown both in FIGURE 3 and in FIGURE 1.

It is during this lateral shifting that the lip 61 is instrumental in spreading the feed 134 so that it forms a continuous layer of a uniform depth, the individual rows losing their identity as rows or longitudinal piles in the process. Actually, the advancement or lateral shifting of the conveyor 54 through the agency of the motor 102 is only in an incremental or stepwise manner. In the illustrated situation, the amount of movement of the conveyor 54 is determined by the fact that the movement lessens the pressure applied to the blade portion 108 of the rocker arm 106. Sufficient movement will reduce the pressure to such an extent that the spring 112 will return the rocker arm 106 into its normal position, this position causing the switch contacts 114 to open again and therefore stop the motor 102. Stoppage of the motor 102 is derived by reason of the fact that when the switch contacts 114 open, then the operating coil of the relay 116 is de-energized so as to result in opening of its switch contacts 118.

It is of importance to note that the rotation of the screw 78 is in the direction of the arrow 86 shown in FIGURE 3. Thus, the screw 78, due to the presence of the arcuate bottom 64, continually attempts to climb the curved wall formed by the arcuate bottom 64, this climbing tendency being in a direction away from the slot 68. Such action takes the pressure from the feed 134 that has been deposited in the trough 10, since this manner of functioning causes the feed 132 within the casing 56 to drop through the slot 68 only by gravity. Not only does this action enhance the uniformity of deposited feed 134, but it causes a minimum of separation where two or more kinds of mixed feed are simultaneously fed. While not shown, it can be mentioned at this stage that the feeding trough 10 can be provided with a central baffle so that it is possible to deposit rows of different kinds of feed to either side of the baffle. The feeding yards can in this way be arranged, for instance, so that new livestock can be fed only silage and rough feed while finish livestock can be fed grain and concentrate. Actually, many different combinations of feed can be realized for two classes of livestock, one at one side of the trough and the other at the opposite side.

From what has been said, it should be apparent that successive rows of feed are deposited. Stated in a different fashion, one row would be deposited subjacent the phantom outline position of the conveyor 34 shown in FIGURE 3, then a second row of either the same type of feed or a different type would be deposited at a locus somewhat to the right but parallel to the first row. This action is incrementally continued in a stepwise fashion, the motor 102 causing the shifting of the conveyor 54 whenever the rocker arm 106 is acted upon by feed pressing against the blade portion 108. Thus, the conveyor 54 is moved in stages from one locus to another until it has advanced completely across the trough 10, that is, from a locus adjacent the left side 12 in FIGURE 3 to a locus adjacent the right side 12 in this particular figure.

When the conveyor 54 has traversed the width of the trough 10, it follows that a uniform layer of feed 134 has been deposited or distributed between the sides 12. Whereas the brackets 46 and the threaded rods 50 supported thereby are adjusted so that the conveyor 54 is suspended at a desired elevation with respect to the bottom of the trough 10, it will be appreciated that the conveyor 54 can be either raised or lowered as circumstances dictate so as to deposit a thicker or thinner layer of feed 134. More specifically, when a larger number of cattle or other livestock are to be accommodated, then the conveyor 54 can be raised and a deeper layer of feed will result.

It will be understood, though, that the limit switch 126 is opened only when the conveyor 54 has been moved to a locus adjacent the right side 12 as viewed in FIGURE 3. This prevents the motor 102 from being energized again because the circuit involving the operating coil of the relay 116 is interrupted due to the opening of the normally closed contacts of the limit switch. It will also be perceived that the indicating lamp 130, which may be located at any desired or convenient remotely situated station, will be lighted each time that the normally open switch contacts 114 are closed, this being the situation when the motor 102 is running. The operator or attendant, under these circumstances, will note when the lamp 130 has remained unlighted for a sufficient time and will then realize that the conveyor 54 has made a complete traverse of the trough 10. Obviously, the lamp 130 could be energized only when the limit switch 126 has been actuated, in this situation an additional set of contacts which are normally open being closed by the plunger 128 to complete a circuit through the lamp 130. While the motor 102 can be made to reverse itself automatically, the circuit of FIGURE 4 is considerably simplified by showing only the means for energizing the motor 102 to cause it to operate in one direction. Thus, FIGURE 4 is designed to cause the conveyor 54 to move from the left to the right in FIGURE 3 and it will be up to the operator or attendant to manually actuate a reversing switch (not shown) in order to return the conveyor 54 to its phantom outline position shown in FIGURE 3. While a somewhat semi-automatic type of operation has been described, it will be recognized that the circuit of FIGURE 4 can be modified so as to effect an automatic return of the conveyor 54 or even to feed row increments in the opposite direction. This feature is sometimes desirable where the divider or baffle 13 is employed since feed can be first deposited at either of the out side edges of the trough and continued inward toward the baffle for a predetermined distance. Livestock may thus begin to feed on the first row without waiting for the entire ration to be deposited.

It will, of course, be understood that various changes may be made in the form, details, arrangements and proportions of the parts without departing from the scope of my invention as set forth in the appended claims.

What is claimed:
1. Feeding apparatus comprising:
 (a) a trough;
 (b) a frame surmounting said trough including a plurality of parallel rails overlying said trough;
 (c) trolley means movable along said rails;
 (d) an auger-type conveyor suspended from said trolley means provided with an elongated casing having a longitudinal slot in the lower wall thereof via which feed is discharged into said trough;
 (e) first electric motor means for operating said conveyor to advance feed through said casing and out said slot;
 (f) second electric motor means for moving said trolley means along said rails from one side of said trough to the other;
 (g) means for introducing feed into one end of said conveyor, and
 (h) means at the other end of said conveyor for caus- ing energization of said second electric motor means when feed builds up to a predetermined extent at said other end to shift said conveyor to a new position, (i) whereby said conveyor will be advanced laterally in steps.

2. Apparatus in accordance with claim 1 including:

(a) means movable in unison with said conveyor for spreading the feed deposited by said conveyor so that the feed in said trough constitutes a layer of uniform depth.

3. Apparatus in accordance with claim 2 including:

(a) means for adjusting the height of said conveyor so as to vary said depth.

4. In combination with a trough, apparatus for delivering and distributing feed thereto comprising:

(a) conveyor means including a casing having a downwardly directed longitudinal slot and an auger screw mounted for rotation within said casing for advancing feed therealong so as to be progressively discharged through said slot into said trough to form a first row of feed;

(b) means for introducing feed to said conveyor means at one end thereof;

(c) adjustable means for supporting said conveyor means at a preferred elevation above said trough;

(d) means for shifting said conveyor means laterally at said preferred elevation;

(e) sensing means mounted at the other end of said conveyor means so as to be movable in unison therewith when said conveyor means is adjusted to said preferred elevation, (f) said last-mentioned means including a member actuated by a sufficient build-up of feed at said other end of said conveyor means for causing said shifting means to become operative and thereby move said conveyor means sufficiently laterally for the deposit of a second row of feed adjacent said first row of feed (g) whereby the height of said sensing means as influenced by the preferred elevation of said conveyor means will determine the total amount of feed to be deposited in said trough.

5. Apparatus for delivering and distributing feed to a trough comprising:

(a) conveyor means extending longitudinally of the trough and adapted to discharge feed substantially throughout its entire length;

(b) means for introducing feed to said conveyor means at one end thereof, (c) said conveyor means including a casing having a downwardly directed longitudinal slot and an auger screw mounted for rotation within said casing for advancing feed therealong so as to be progressively discharged through said slot into said trough to form a first row of feed;

(d) electric motor means for moving said conveyor means laterally, and (e) means at the other end of said conveyor means for initiating lateral movement of said conveyor means when a sufficient amount of feed has been conveyed to said other end, (f) said means for initiating lateral movement including a blade member pressurally acted upon by feed in said conveyor reaching said other end and a normally open switch in circuit with said electric motor means actuatable into closed position to start said electric motor means when feed pressurally acts on said blade member and to stop said electric motor means when the pressure against said blade member has decreased sufficiently whereby said conveyor means is caused to move laterally from a first position to a second position spaced from said first position.

References Cited by the Examiner
UNITED STATES PATENTS

| | | | |
|---|---|---|---|
| 2,632,423 | 3/53 | Cordis | 119—56 |
| 2,970,568 | 2/61 | Johnson | 119—52 |
| 2,981,402 | 4/61 | Cleaveland. | |
| 3,103,913 | 9/63 | Sime | 119—52 |

SAMUEL KOREN, *Primary Examiner.*

HUGH R. CHAMBLEE, *Examiner.*